(12) United States Patent
Archie et al.

(10) Patent No.: US 6,185,323 B1
(45) Date of Patent: Feb. 6, 2001

(54) METHOD CHARACTERIZING A FEATURE USING MEASUREMENT IMAGING TOOL

(75) Inventors: Charles N. Archie, Granite Springs; Eric P. Solecky, Wappingers Falls, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 08/956,818

(22) Filed: Oct. 23, 1997

(51) Int. Cl.$^7$ ..................................................... G06K 9/00
(52) U.S. Cl. ........................... 382/145; 382/207; 382/152
(58) Field of Search .................... 382/141, 145, 382/147, 149, 150, 156, 152, 207; 395/500.05, 500.06; 356/351, 356, 394; 438/7, 10; 348/86, 87, 125, 126, 129

(56) References Cited

U.S. PATENT DOCUMENTS

| | | | |
|---|---|---|---|
| 5,210,041 | * 5/1993 | Kobayashi et al. | 438/7 |
| 5,598,345 | * 1/1997 | Tokura | 395/500.05 |
| 5,621,652 | * 4/1997 | Eakin | 395/500.06 |
| 5,880,838 | * 3/1999 | Marx et al. | 356/351 |

OTHER PUBLICATIONS

Diana Nyysonen, "Collection of Low Energy Secondary Electrons and Imaging in a Low Voltage SEM", SPIE vol. 2725, 562–571 (1996).

L. Reimer, Image Formation in Low–Voltage Scanning Electron Microscopy, pp. 22–23, SPIE Optical Engineering Press, 1993.

W. Conley et al., "Advances in Resist Technology & Processing XIV", SPIE vol. 3049, 282–299 (1997).

Chas Archie, et al., "Contact Holes: A Challenge for Signal Collection Efficiency and Measurement Algorithms", SPIE 1997 (In press), and Presented at SPIE Microlithography Conference on Mar. 10.

* cited by examiner

*Primary Examiner*—Joseph Mancuso
*Assistant Examiner*—Vikkram Bali
(74) *Attorney, Agent, or Firm*—Ratner & Prestia; Tiffany L. Townsend, Esq.

(57) ABSTRACT

A method determining the status of a feature (e.g., a semiconductor contact hole or trench) using a measurement imaging tool such as a scanning electron microscope (SEM). The method first assures that the waveform signal obtained from the SEM is reliable. A blanked beam signal, provided in saved images from the SEM, is the basis for a signal quality factor. This signal is provided in the waveform analyzed by the system. The method then analyzes all of the data between the edges of the feature and fits various functions to the data to determine which provides the best fit. Multiple linear regression and the $r^2$ (quality of fit) factor, or some other type of correlation coefficient, are used to determine which function has the best fit. The feature is then characterized based on the particular function chosen and on the correlation factor obtained. The method of the present invention provides information which can be used to determine the line width or diameter measurement of the feature and whether the feature is open or closed.

24 Claims, 6 Drawing Sheets

METHOD CHARACTERIZING A FEATURE USING MEASUREMENT IMAGING TOOL

TECHNICAL FIELD

The present invention relates generally to metrology and, more particularly, to an improved method for analyzing the data produced by measurement imaging tools of semiconductor features such as contact holes and trenches.

BACKGROUND OF THE INVENTION

Most modern electric circuits are formed as "printed" circuits on a substrate. In the field of circuit fabrication, one of the more critical functions is the ability to control the size (length, width, height), or critical dimensions (CD), of features such as contact holes and trenches which form the circuits. Any deviation in the dimensions of a feature can adversely impact on the performance of the resulting circuitry.

As critical features become smaller, metrology (the science of measurement) using imaging tools such as optical microscopes, scanning electron microscopes (SEM), atomic force microscopes (AFM), and other similar tools becomes more challenging. The challenge is especially acute for contact holes and trenches with diameters less than 0.25 μm. For example, reduced collection efficiency of SEM secondary electrons from such contact holes and trenches can provide false edge sharpening. For this and other reasons, current measurement methodologies are poor in their correlation wish cross section results taken from actual samples. Reduced collection efficiency also may interfere with obtaining critical information from the bottom of a contact hole.

Optical microscopes, SEM, and AFM are all instruments used to obtain an enlarged image of a small object such as semiconductor features. An optical microscope generally has a light source, a condenser, an objective, and a recording device such as a photoelectric tube or a photographic plate. The optical microscope is limited by the wavelengths of the light used and by the materials available for manufacturing the lenses.

A SEM is an electron instrument that builds up its image as a time sequence of points in a manner similar to that used in television. The imaging method of the SEM allows separation of the two functions of a microscope: localization and information transfer. The SEM uses a very fine probing beam of electrons which sweeps over the specimen to emit a variety of radiations. The signal, which is proportional to the amount of radiation leaving an individual point of the specimen at any instant, can be used to modulate the brightness of the beam of the display cathode ray tube as it rests on the corresponding point of the image. In practice, the points follow one another with great rapidity so that the image of each point becomes the image of a line. The image can also be recorded in its entirety by allowing the point-by-point information to build up in sequence on a photographic film.

The AFM waveform may be a more accurate representation of the actual topology of the specimen, than that produced by the optical microscope or SEM, because an AFM is analogous to a stylus that runs along the surface of the specimen. When the tip of the AFM encounters a feature, the tip rises; when the surface goes down, the AFM records the actual vertical motion alone the axis, mimicking the actual motion of the tip across the surface. Instead of using an electron beam, the AFM actually monitors the vertical motion as a function of time analogous to the stylus of an analog disc player. The AFM tip is more sensitive than a stylus, however, and senses the sur ace electronically. Because the tip does not actually touch the surface of the specimen, no risk of damage arises. The AFM provides a waveform which is similar to a topology path. The common step in both SEM and AFM measurement is the identification of characteristic components of the waveform generated by the tool.

Figure 1:
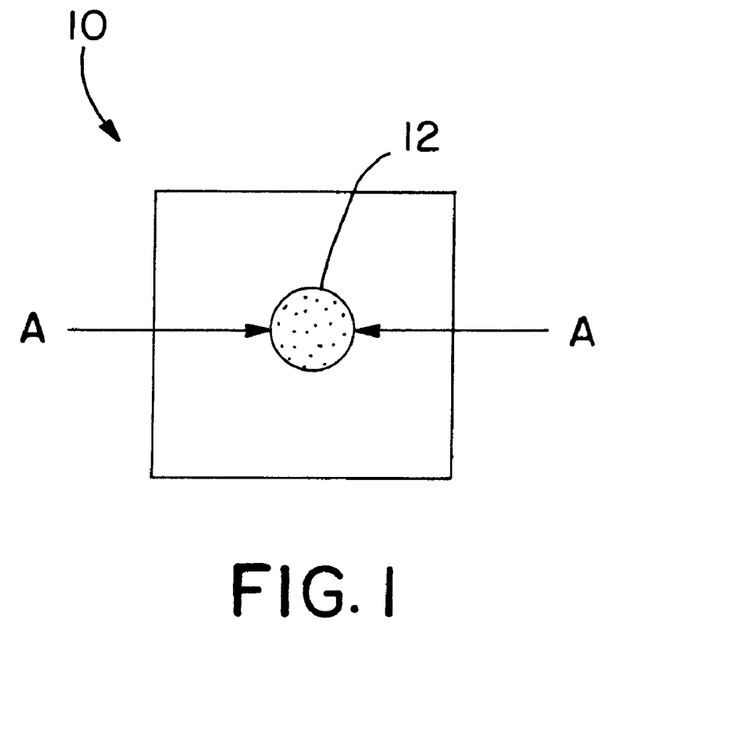
FIG. 1 shows a CD SEM image of a contact hole.
Figure 2:
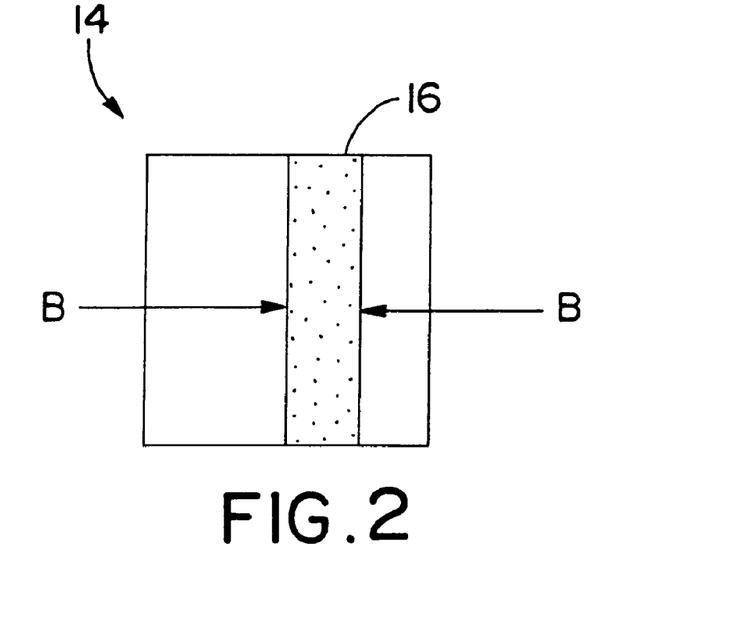
FIG. 2 shows a CD SEM image of a trench.

Metrology tools typically report only the diameter (or line width) of a particular feature. Shown in FIG. 1 is a CD SEM image 10 of a contact hole 12; the diameter of contact hole 12 is identified between the arrows "A." Shown in FIG. 2 is a CD SEM image 14 of a trench 16; the line width of trench 16 is identified between the arrows "B." The measurement results from analyzing the waveform for edge information. Sometimes subroutines are added to further explore the waveform information content around the edge to determine if a resist foot is present. This approach is most robust for an isolated line where a determination of the surrounding signal baseline can be established. When applied to contact holes and dense structures like nested lines, however, difficulties often arise in implementing this approach.

Furthermore, the conventional approach does not reliably provide information concerning whether the feature (contact hole or trench) is open or closed. Such information is an important concern and could be determined from the waveform in many cases. As critical features become smaller, more information is needed than simply the line width or diameter. Information about the status of the contact hole or trench proves valuable and, in some cases, is more important than the line width or diameter.

The deficiencies of the conventional measurement methodologies show that a need still exists for a method which will accurately and reliably characterize a semiconductor feature such as a contact hole or trench. To overcome the shortcomings of the conventional measurement methodologies, a new method is provided. An object of the present invention is to provide a method which accurately, reliably, and with high quality measures the width or diameter of a feature.

Another object of the present invention is to provide a measure of the collection efficiency of the CD SEM used to collect waveform data from the feature for characterization of the feature. A related object is to use the measure of the collection efficiency to determine whether information from the bottom of the feature is meaningful. When the information is found to be meaningful, yet another object is to use the information to evaluate the status of the feature as open or closed. Finally, a collective object of the present invention is to provide a measure of quality not yet achieved in conventional CD SEM metrology by reporting collection efficiency, whether the feature is open or closed, and an accurate diameter measurement.

SUMMARY OF THE INVENTION

To achieve these and other objects, and in view of its purposes, the present invention provides a method for monitoring a process in which a feature is formed on a substrate. The method includes the steps of (a) obtaining a full waveform signal from edge to edge of the feature using a measurement imaging tool; (b) analyzing the full waveform signal from edge to edge of the feature; and (c) determining from the analyzing step the status of the feature as one of open and closed. More specifically, the method of the present invention monitors a semiconductor manufacturing process in which a feature such as a contact hole or trench is formed on a substrate. In the first step of the method, a full waveform signal is obtained from edge to edge of the feature using a measurement imaging tool. Then, optionally, the reliability of the full waveform signal obtained in the first step is assured. A mathematical equation is fit to the data represented by the full waveform signal and the quality of the fit between the mathematical equation and the data is evaluated. The mathematical equation fit to the data and the quality of the fit are used to characterize the feature, determining information such as a critical dimension of the feature and whether the feature is open or closed. Finally, the information thus determined is used to facilitate semiconductor processing.

It is to be understood that both the foregoing general description and the following detailed description are exemplary, but are not restrictive, of the invention.

BRIEF DESCRIPTION OF THE DRAWING

The invention is best understood from the following detailed description When read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The method of the present invention, as described below, is generally applicable across measuring systems. Thus, any measurement imaging tool which produces a waveform representative of the dimensions of a feature can be used in connection with the method. Such tools include optical microscopes, SEM, AFM, and other similar tools. A specific application of the invention to CD SEM systems is described in greater detail below for purposes of illustration.

The present invention uses information in the waveform obtained from a conventional measurement imaging tool beyond the conventional edge information typically used in measurement methodologies. In particular, for a semiconductor feature such as a contact hole or trench, the full waveform information from edge to edge is analyzed and a determination is made as to the overall quality and status (open or closed) of the feature. Before such an analysis can be reliably applied to the waveform information, however, the data must be checked for its information content. Therefore, the present invention introduces a measure of the collection efficiency by comparing signal strength from the feature with a blanked beam signal. The collection efficiency measure is then used to determine whether information from the bottom of the feature is meaningful. When found to be meaningful, the information is then evaluated to determine the status of the feature. Results are based on saved image analysis.

The data used to confirm the utility and advantages of the present invention were collected, by detecting secondary electrons, using a Model No. 7830i CD SEM available from Opal, Ltd. of San Jose, Calif. The CD SEM operated at 600 eV. These tools routinely provide, in saved images, the intensity signal of the blanked beam. The reliability of this signal as a true measure of the zero of the secondary electrons is tested according to the method of the present invention. Subsequently, intensity information from the feature is fitted to a mathematical equation. The quality of fit between the data and the equation is used to determine the condition of the feature.

A. Testing The Validity Of The Signal From The Feature

The first step in evaluating the signal from a restricted space such as a contact hole or trench is to determine whether the signal is meaningful. The concept of reduced collection efficiency of secondary electrons is discussed in D. Nyyssonen, "Collection of Low Energy Secondary Electrons and Imaging in a Low Voltage SEM," SPIE Vol. 2725, pages 562–71 (1996). Reduced collection efficiency of secondary electrons from such geometries may be so severe that the raw signal is dominated by extraneous effects such as amplifier noise and tool-applied offsets, making the signal essentially useless. Note that automated contrast and brightness control applies an arbitrary gain and offset adjustment to the secondary electron signal.

Figure 3:
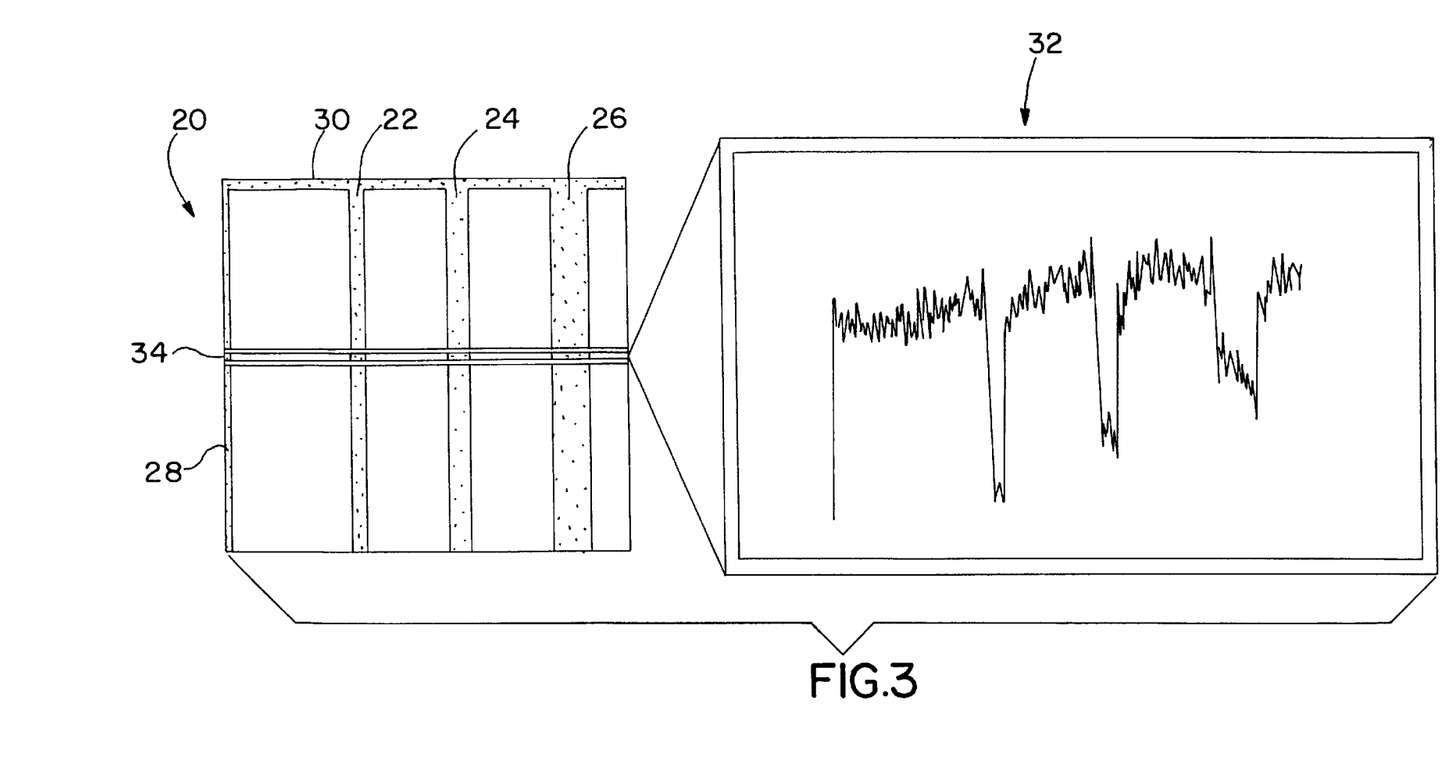
FIG. 3 illustrates an example CD SEM multiple trench image and waveform signal.

The blanked beam signal could be the true zero of the secondary electron signal. To test this, an analysis of the noise level in the signal from trenches of varying aspect ratios was performed. The trenches ranged in widths from 500 nm to 250 nm and had been imaged into 850 nm of resist. About 45 nm of an anti-reflecting coating (ARC) covered the silicon wafer. FIG. 3 is an image 20 of these trenches 22, 24, and 26. The 480 by 480 pixel image 20 was acquired as a single scan lasting 8 seconds. The probe current was 8.5 pA. Besides three trenches in the resist, there are a few dark columns 28 at the left side of the image and a few dark rows 30 at the top of the image 20. These border regions correspond to a signal while the electron beam is blanked by a deflection coil before the SEM critical aperture. A waveform 32 is also shown in FIG. 3 corresponding to the sum of ten rows of the image near the line 34 drawn on the image. The SEM multiple trench image and waveform signal illustrated in FIG. 3 shows that, as the trench width becomes smaller (aspect ratio grows larger), the signal intensity from the trench decreases. Thus, collection efficiency decreases in smaller features.

Figure 4:
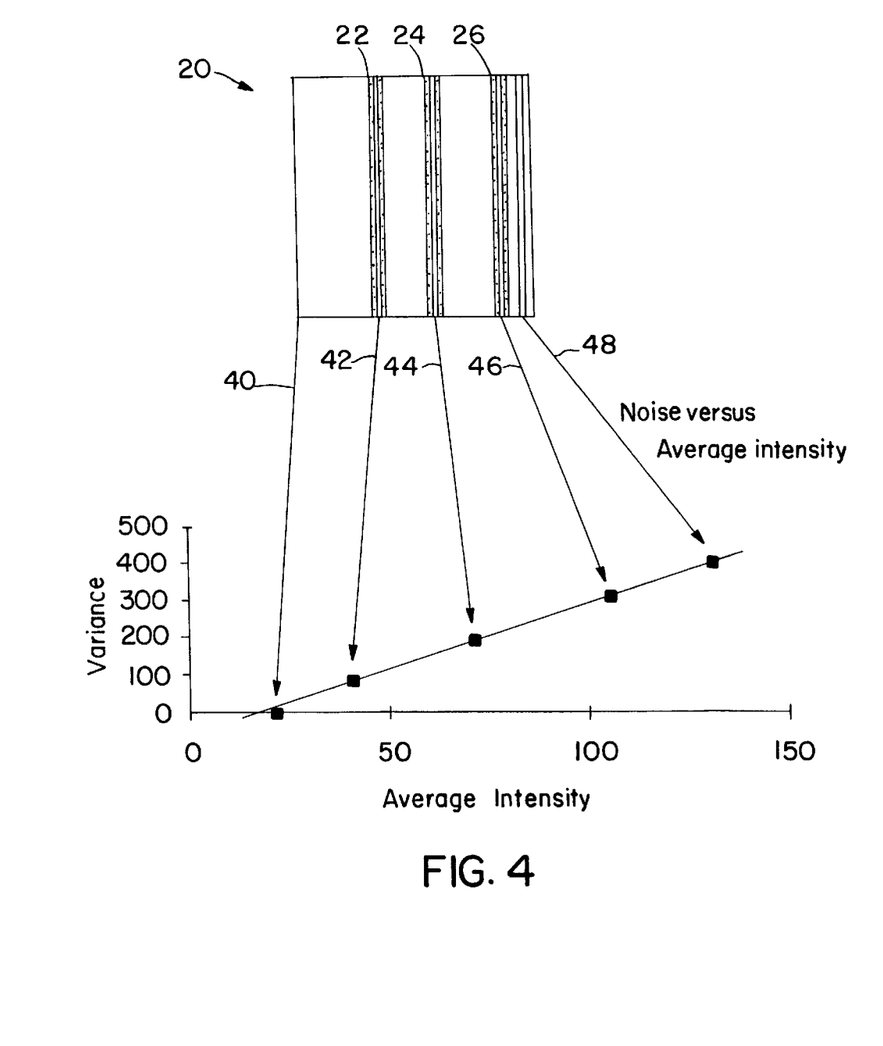
FIG. 4 is a graph of the variance of the signal versus the mean of the signal for the image and waveform signal of FIG. 3.

To perform the test, a single column of pixels 42, 44, and 46 was taken from each of the trenches 22, 24, and 26 in the image 20, along with a column of pixels 48 along the baseline (resist top). The variance (noise) and the mean of these four columns of pixels were calculated. In FIG. 4, the variance of the signal is plotted against the mean of the signal. If the noise in the image 20 is shot noise dominated, then the data in the graph will fall on a straight line with the intercept at the zero of the true secondary electron signal. L. Reimer, "Image Formation in Low-Voltage Scanning Electron Microscopy," pages 22–23, SPIE Optical Engineering Press (1993). Electron emission has an inherent probabilistic nature and shot noise is a measure of the random variation due to the nature of the secondary electron emission.

Also plotted in the graph of FIG. 4 is the beam blanked intensity level 40. Within experimental error, the beam blank signal is the true zero of the secondary electron signal. Only the four data points on the right of the graph were used for the regression fit straight line; the last point on the left, lying on the abscissa (or x axis), represents the blanked beam data point. The straight line indicates that variance or deviation ($\sigma^2$) of the shot noise is proportional to the intensity of the secondary electrons.

In statistics, the deviation represents variation from the trend or the difference between the particular number and the average of the set of numbers under consideration. It is also considered a measure of dispersion. The "standard deviation" is the square root of the arithmetic mean of the squares of the deviations from the mean. In a normal distribution, the parameter C is the standard deviation, where the frequency function is:

$$f(x) = \frac{1}{\sigma\sqrt{2\pi}} e^{-(x-\bar{x})^2/(2\sigma^2)}$$

This is the same as the square root of the second moment around the mean expectation of the variable:

$$\sigma^2 = \int_{-\infty}^{\infty} [x - E(x)]^2 f(x) dx.$$

To estimate the standard deviation of a normal distribution from a random sample, the most usual formula is $$\sigma = \sqrt{\frac{\sum_{i=1}^{n}(x_i - \bar{x})^2}{n-1}},$$

where the mean $\bar{x}$ is estimated from the sample of "n" entries. If the mean of the population is known, n−1 is replaced by n.

The graph of FIG. 4 also indicates that, as the feature widths become smaller, the noise and the mean intensity become smaller. The agreement of the data with a linear trend implies that the signal noise is dominated by shot noise even for the smallest trench analyzed. The shot noise behavior of the data for all sample aspect ratios implies that the presence of noise in the signal signifies that a secondary electron signal is present. Thus, shot noise is found to be an important parameter to monitor.

B. Testing The Feature Information

In conventional measurement methodologies, the CD SEM typically concentrates on edge information in the acquired waveform in order to determine a feature dimension. For a contact hole or trench, however, the determination of whether the feature is open or closed is equally important. Often this relevant information is present in the same waveform from which the feature dimension is determined. The signal data between contact edges must be analyzed to determine whether the feature is open or closed.

Figure 5:
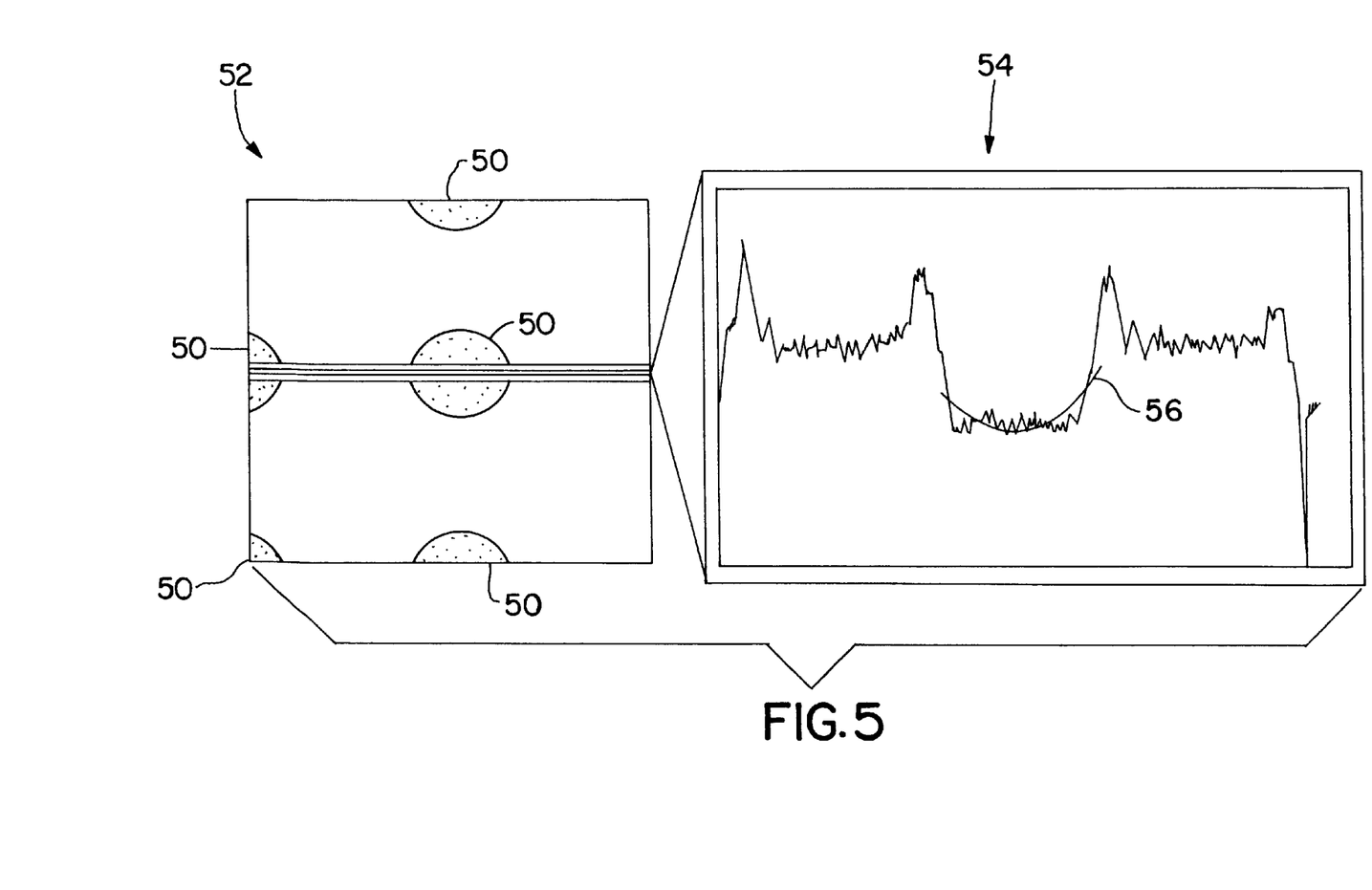
FIG. 5 is an example CD SEM contact hole image and waveform signal taken from a focus exposure matrix wafer, with a quadratic equation fit to the signal.

A focus exposure matrix wafer (FEM) was used for purposes of analysis. The wafer consisted of nominally 250 nm contact holes in 625 nm UV4HS resist with 99 nm of ARC on silicon. For a discussion of UV4HS resist, see W. Conley et al., "Advances in Resist Technology & Processing XIV", SPIE Vol. 3049, 282–259 (1997). A matrix of 7 focus values and 5 dose values (total 35 images) was used with step sizes sufficient to evaluate the entire process window. Images were acquired of contact holes 50 for each field using a one-second, single scan. A typical contact hole image 52 is shown in FIG. 5. Ten rows of pixels through the contact hole 50 were summed to produce a waveform 34. Despite a seemingly uniform dark region for the contact hole 50, the waveform 54 shows a noisy signal above the blanked beam value. Based on the earlier analysis, the presence of this noise in the contact hole 50 indicates that the signal is real information about the secondary electrons. Furthermore, the signal level is well above the blanked beam system in all cases.

Waveforms for all thirty-five fields were entered into a spreadsheet for analysis. The data between the inner edge maximum slopes were fit to a quadratic equation form (three parameter fit; $ax^2+bx+c=0$) in each case. The maximum slope technique proved more sensitive to rounding of the signal than using the peak-to-peak data. Also shown in FIG. 5 is the quadratic equation fit 56 for the given waveform 54. The quality of each fit (curve to data) is represented by a correlation factor, in this case $r^2$ (a higher $r^2$ implies a better fit, where an $r^2$ of one represents a perfect fit). The correlation factor $r^2$ in this case is 0.5452.

In statistics, "correlation" refers to the interdependence between two sets of numbers. The correlation is a relation between two quantities, such that when one changes the other does (simultaneous increasing or decreasing is called positive correlation; one increasing, the other decreasing, is called negative correlation). The "correlation coefficient" is a number between −1 and 1 which indicates the degree of linear relationship between two sets of numbers. If the two sets of numbers are $(x_1, x_2, \ldots, x_n)$ and $(y_1, y_2, \ldots, y_n)$, the coefficient of correlation r measures how near the points $(x_1, y_1), (x_2, y_2), \ldots, (x_n, y_n)$ are lying on a straight line. If r=1, the points lie on a line and the two sets of data are said to be in perfect correlation. More particularly, the coefficient of correlation r is defined to be the quotient of the sum of the products of the algebraic deviations of the corresponding numbers of the two sets and the square root of the product of the sum of the squares of the deviations of each set:

$$r = \frac{\sum_{i=1}^{n}(x_i - x)(y_i - y)}{\sqrt{\sum_{i=1}^{n}(x_i - x)^2 \sum_{t=i}^{n}(y_i - y)^2}}.$$

The "correlation ratio," $1-\sigma_{xy}^2/\sigma_x^2$, is equal to the square of the correlation coefficient if the regression of x on y is linear. Here $\sigma_x$ denotes standard deviation, r is the correlation coefficient, and $\sigma_{xy}$ is the standard deviation of x categorized by intervals of the y variable.

Figure 6:
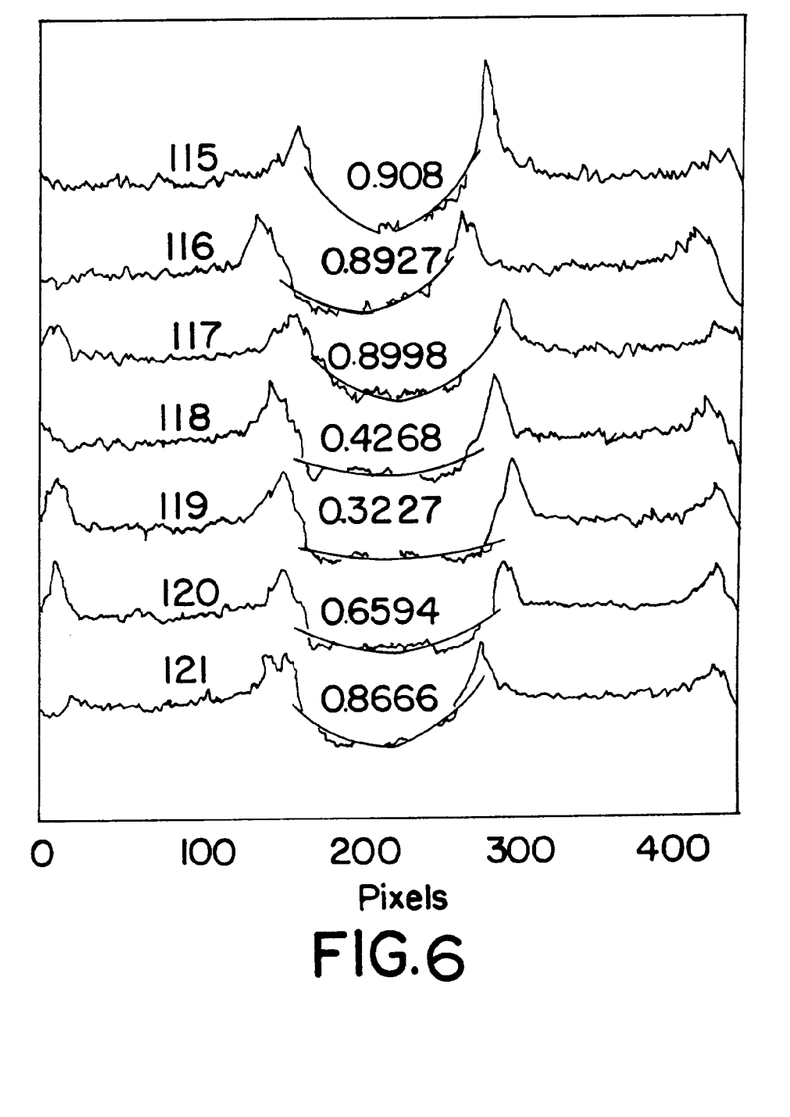
FIG. 6 shows seven waveform signals taken across focus (i.e., at varying focus) at a constant best dose with quadratic equation fits to the waveforms.

If the fit of the quadratic equation is "good" (i.e., the correlation factor $r^2$ approaches unity), then the feature (contact or trench) is closed. A poor fit (i.e., the correlation factor $r^2$ is far from unity) implies that the feature is open. Wafer cross sections confirm that features with very flat signals are indeed open and those with rounded signals are not. FIG. 6 shows seven waveform signals taken across the full span of focus (i.e., at varying stepper focus) and at a constant, best dose. Signals at the top and bottom of the graph in FIG. 6 are out of focus and signals in the middle are in focus. Quadratic equations were fit to each of the waveforms and correlation factors were calculated for each fit. The correlation factors for each of the waveform signals in FIG. 6 were:

| Signal No. | Correlation Factor ($r^2$) |
|---|---|
| 115 | 0.908 |
| 116 | 0.8927 |
| 117 | 0.8998 |
| 118 | 0.4268 |
| 119 | 0.3227 |
| 120 | 0.6594 |
| 121 | 0.8666 |

This slice of the data set clearly illustrates a region of cleared or open features (with flat signals and low correlation factors) in the center and closed features (with rounded signals and high correlation factors) on the ends.

Figure 7:
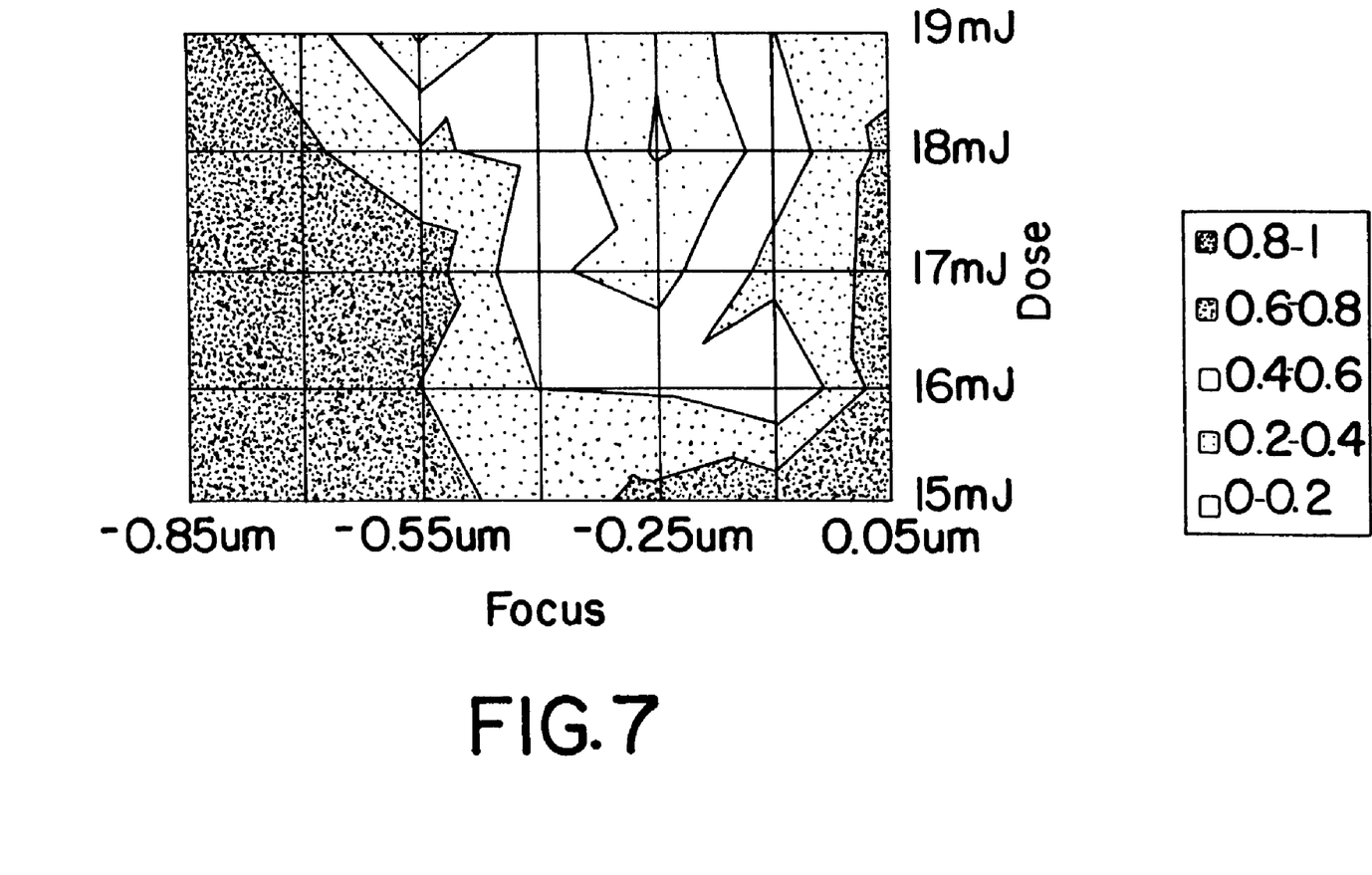
FIG. 7 is a contour plot (maximum slope to maximum slope) of the correlation factor $r^2$ plotted across the entire focus exposure matrix wafer.

FIG. 7 shows a contour plot (top down) of $r^2$ values along focus and dose, plotted across the entire FEM. At best focus and increasing dose, the $r^2$ value approaches a minimum and at worst focus and in the underexposed regions the $r^2$ value approaches unity. Thus, $r^2$ tends to decrease at center focus and increase along the extremes in focus. The contour plot of FIG. 7 helps to visualize the concept that, as the tool moves out of focus (left and right) and to lower doses, the fit becomes better—indicating rounding of the signal and hence closing of the feature. The total process window is highlighted for this resist at these conditions in the plot. The combination of inspection and cross-section information suggests that an $r^2$ of about 0.80 corresponds to the transition from open features to closed (or "scummed") features. There is excellent correlation between this easily automated evaluation procedure and human inspection.

The method of the present invention analyzes all of the data between the edges of the feature and fits various functions to the data to determine which provides the best fit. For example, if the CD SEM measurement waveform is rounded between the edges, then a second-order polynomial (i.e., a quadratic equation) provides a good fit and indicates a closed feature. If the waveform has a flat region between the edges, then a trapezoidal-type function would be appropriate and would correspond to a cleared or open feature. Multiple linear regression and the $r^2$ (quality of fit) factor, or some other type of correlation coefficient, are used to determine which function has the best fit. The feature is then characterized based on the particular function chosen and on the correlation factor obtained. Although waveforms typically fall into these two categories of functions (namely, quadratic and trapezoidal), other functions can be created to fit any type of waveform shape encountered. Such functions can be added to a library of functions made available to help more accurately track information on the waveform.

A CD SEM can do more than just report an estimate of the dimensions of a feature such as a contact hole diameter (although this information, too, is valuable). Information is present in the waveform signal indicating whether the feature is open or closed. The method of the present invention provides information which can be used to determine both the line width or diameter measurement and whether the feature is open or closed. The information also can be used as a kind of smoothing filter to eliminate the need for smoothing in parts where smoothing is traditionally applied and to eliminate some processing steps. Finally, the information obtained can be used to improve the correlation between top-down SEMs and cross-section measurements. In short, the method of the present invention provides additional information needed to facilitate semiconductor processing.

The additional steps required to further characterize the feature, beyond an estimate only of the dimensions of the feature, involve only a modest amount of computation. A standard spreadsheet-fitting routine can provide the information necessary to "flag" the condition of the feature as open or closed. The CD SEM itself can automatically perform the computation each time a feature dimension is measured. Thus, the method of the present invention permits automation and requires only additional computation on the waveform, which is easily accommodated by existing CD SEM work stations, to provide valuable information characterizing the feature.

For the particular samples studied, there was no problem with trusting the information obtained from the feature. There can be no guarantee of such reliability, however, in all applications. As dimensions shrink, aspect ratios grow, or charging effects enter, some method to evaluate the quality of the signal received from the confined geometries of trenches and holes must be provided. The present invention uses a blanked beam signal, provided in saved images from the CD SEM, as the basis for a signal quality factor. This signal is provided in the waveform analyzed by the system. Such a process is possible because a SEM normally blanks the beam after each line scan and certainly after completion of the measurement process. At these points, it is possible to get the blanked beam signal level after automatic brightness and contrast control. Provided with this zero level, the actual secondary electron signal strength within the feature can be determined. A threshold may be necessary to reject too weak a signal.

Taken together, the steps of evaluating the quality of the signal from the geometry, and flagging when the feature is closed, add valuable information to the report of the CD SEM. This approach reduces the need for manual inspection and is also more sensitive. Many of the closed features revealed by application of the present invention appear uniformly dark when visually inspected. Only by analyzing a trusted signal can additional information characterizing the feature be reliably extracted.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for monitoring a process in which a feature is formed on a substrate, the method comprising the steps of:
   (a) obtaining a full waveform signal from edge to edge of the feature using a measurement imaging tool;
   (b) analyzing the full waveform signal from edge to edge of the feature;
      (b1) fitting a mathematical equation to the data represented by full waveform signal, the mathematical equation is one of a second-order polynomial and a trapezoidal function;
      (b2) determining the correlation of the fit between the mathematical equation and the data represented by the full waveform signal; and
   (c) determining from the analyzing step the status of the feature as one of open and closed.

2. The method of claim 1 further comprising the step (a1), before the step (b) of analyzing the full waveform signal, of assuring the reliability of the full waveform signal obtained in step (a).

3. The method of claim 1 wherein the step (c) of determining the status of the feature as one of open and closed is based upon the mathematical equation fit to the data and upon the correlation of the fit.

4. The method of claim 1 wherein the step (b1) of fitting a mathematical equation to the data is done by multiple linear regression analysis.

5. The method of claim 1 wherein the step (b2) of determining the correlation of the fit is done by calculating a correlation factor.

6. The method of claim 1 wherein the feature is one of a semiconductor contact hole and a semiconductor trench, and the status of the feature is used to facilitate semiconductor processing.

7. The method of claim 1 further comprising the step (d) of determining from the analyzing step a critical dimension of the feature.

8. The method of claim 1 wherein the measurement imaging tool is one of an optical microscope, a scanning electron microscope, and an atomic force microscope.

9. The method of claim 8 wherein the measurement imaging tool is a scanning electron microscope and the method further comprises the step (a1), before the step (b) of analyzing the full waveform signal, of assuring the reliability of the full waveform signal obtained in step (a) by measuring the collection efficiency of the scanning electron microscope used to obtain the full waveform signal.

10. The method of claim 9 wherein the step of assuring the reliability of the full waveform signal includes comparing the strength of the full waveform signal with a blanked beam signal.

11. A method for monitoring a process in which a feature is formed on a substrate, the method comprising the steps of:
(a) obtaining a full waveform signal from edge to edge of the feature using a measurement imaging tool;
(b) assuring the reliability of the full waveform signal obtained in step (a);
(c) fitting a mathematical equation to the data represented by the full waveform signal, the mathematical equation is one of a second-order polynomial and a trapezoidal function;
(d) determining the correlation of the fit between the mathematical equation and the data represented by the full waveform signal; and
(e) characterizing the feature based upon the mathematical equation fit to the data and upon the correlation of the fit.

12. The method of claim 11 wherein the step of characterizing the feature includes at least one of determining a critical dimension of the feature and determining whether the feature is closed.

13. The method of claim 11 wherein the step (c) of fitting a mathematical equation to the data is done by multiple linear regression analysis.

14. The method of claim 11 wherein the step (d) of determining the correlation of the fit is done by calculating a correlation factor.

15. The method of claim 11 wherein the feature is one of a semiconductor contact hole and a semiconductor trench, and the status of the feature is used to facilitate semiconductor processing.

16. The method of claim 11 wherein the measurement imaging tool is one of an optical microscope, a scanning electron microscope, and an atomic force microscope.

17. The method of claim 16 wherein the measurement imaging tool is a scanning electron microscope and the step (b) of assuring the reliability of the full waveform signal includes measuring the collection efficiency of the scanning electron microscope.

18. The method of claim 17 wherein the step (b) of assuring the reliability of the full waveform signal includes comparing the strength of the full waveform signal with a blanked beam signal.

19. A method for monitoring a semiconductor manufacturing process in which a feature such as a contact hole or trench is formed on a substrate, the method comprising the steps of:
(a) obtaining a full waveform signal from edge to edge of the feature using a measurement imaging tool;
(b) assuring the reliability of the full waveform signal obtained in step (a);
(c) fitting a mathematical equation to the data represented by the full waveform signal, the mathematical equation is one of a second-order polynomial and a trapezoidal function;
(d) determining the correlation of the fit between the mathematical equation and the data represented by the full waveform signal;
(e) determining information, including at least one of a critical dimension of the feature and whether the feature is closed, based upon the mathematical equation fit to the data and upon the correlation of the fit; and
(f) using the information to facilitate semiconductor processing.

20. The method of claim 19 wherein the step (c) of fitting a mathematical equation to the data is done by multiple linear regression analysis.

21. The method of claim 19 wherein the step (d) of determining the correlation of the fit is done by calculating a correlation factor.

22. The method of claim 19 wherein the measurement imaging tool is one of an optical microscope, a scanning electron microscope, and an atomic force microscope.

23. The method of claim 22 wherein the measurement imaging tool is a scanning electron microscope and the step (b) of assuring the reliability of the full waveform signal includes measuring the collection efficiency of the scanning electron microscope.

24. The method of claim 23 wherein the step (b) of assuring the reliability of the full waveform signal includes comparing the strength of the full waveform signal with a blanked beam signal.

* * * * *

UNITED STATES PATENT AND TRADEMARK OFFICE
CERTIFICATE OF CORRECTION

PATENT NO. : 6,185,323 B1
DATED : February 6, 2001
INVENTOR(S) : Charles N. Archie et al.

Page 1 of 1

It is certified that error appears in the above-identified patent and that said Letters Patent is hereby corrected as shown below:

<u>Column 3,</u>
Line 19, delete "When" and insert -- when --; and

<u>Column 5,</u>
Between lines 15 and 20, delete the formula in its entirety and insert $$-- f(x) = \frac{1}{\sigma\sqrt{2\pi}} e^{-(x-\bar{x})^2/(2\sigma^2)} . --.$$

Signed and Sealed this

Fifth Day of February, 2002

Attest:

JAMES E. ROGAN
*Attesting Officer*     *Director of the United States Patent and Trademark Office*